(12) United States Patent
R et al.

(10) Patent No.: US 11,128,564 B2
(45) Date of Patent: Sep. 21, 2021

(54) SYSTEMS AND METHODS TO FILTER OUT NOISY APPLICATION SIGNATURES TO IMPROVE PRECISION OF FIRST PACKET APPLICATION CLASSIFICATION

(71) Applicant: Citrix Systems, Inc., Fort Lauderdale, FL (US)

(72) Inventors: Siddharth G R, Bengaluru (IN); Naveen Chowdary Yerramneni, Bengaluru (IN); Tarun Kumar Hukmichand, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 10 days.

(21) Appl. No.: 16/196,799

(22) Filed: Nov. 20, 2018

(65) Prior Publication Data
US 2020/0162369 A1    May 21, 2020

(51) Int. Cl.
*H04L 12/725*    (2013.01)
*H04L 12/26*    (2006.01)
*H04L 12/741*    (2013.01)
*H04L 12/859*    (2013.01)
*H04L 12/851*    (2013.01)

(52) U.S. Cl.
CPC .......... *H04L 45/306* (2013.01); *H04L 43/16* (2013.01); *H04L 45/745* (2013.01); *H04L 47/2441* (2013.01); *H04L 47/2475* (2013.01); *H04L 47/2483* (2013.01)

(58) Field of Classification Search
CPC ............. H04L 45/306; H04L 47/2475; H04L 47/2441; H04L 47/2483
See application file for complete search history.

(56) References Cited

U.S. PATENT DOCUMENTS

| | | | | |
|---|---|---|---|---|
| 7,644,150 | B1 * | 1/2010 | Nucci | H04L 47/2475 706/12 |
| 7,944,822 | B1 * | 5/2011 | Nucci | H04L 41/142 370/229 |
| 8,964,548 | B1 * | 2/2015 | Keralapura | H04L 43/026 370/235 |
| 2008/0232275 | A1 * | 9/2008 | Eswaran | H04L 12/4625 370/256 |

(Continued)

FOREIGN PATENT DOCUMENTS

| EP | 1 715 624 A1 | 10/2006 |
|---|---|---|
| EP | 2 701 353 A1 | 2/2014 |

OTHER PUBLICATIONS

International Search and Written Opinion for International Appl. No. PCT/US2019/061095, dated Feb. 6, 2020.

(Continued)

*Primary Examiner* — Nam T Tran
(74) *Attorney, Agent, or Firm* — Foley & Lardner LLP

(57) ABSTRACT

The system and methods discussed herein provide for filtering out noisy application signatures to improve the precision of first packet application classification. In some implementations, the system receive application signatures from devices along with their network identifiers. Based upon the frequency at which identical application signatures appear as originating from distinct network environments, the system determines the validity of application signatures and avoids storing irrelevant information for routing network traffic.

17 Claims, 3 Drawing Sheets

(56) References Cited

U.S. PATENT DOCUMENTS

2017/0288987 A1* 10/2017 Pasupathy ............... H04L 47/10

OTHER PUBLICATIONS

Sen, S., et al, "Accurate, Scalable In-Network Identification of P2P Traffic Using Application Signatures", International World Wide Web Conference, May 17, 2004 (May 17, 2004), pp. 512-521, XP002389082, ISBN: 978-1-59593-051-4.
International Preliminary Report on Patentability on PCT Application No. PCT/US2019/061095 dated Jun. 3, 2021.

* cited by examiner

SYSTEMS AND METHODS TO FILTER OUT NOISY APPLICATION SIGNATURES TO IMPROVE PRECISION OF FIRST PACKET APPLICATION CLASSIFICATION

FIELD OF THE DISCLOSURE

The present application generally relates to filtering out noisy application signatures for application routing.

BACKGROUND OF THE DISCLOSURE

Classifying a connection between a destination internet protocol (IP) address and an application is useful for performing application-based routing and other networking functions. Connections are classified and stored in a lookup table, which could become populated with peer IP addresses from peer-to-peer connections. The resulting lookup table may be large and inefficient, overpopulated with rarely-used or only once-used connection details, increasing memory requirements and slowing down queries of the table for important or often-used connection details.

BRIEF SUMMARY OF THE DISCLOSURE

The system and methods discussed herein provide for filtering out noisy application signatures to improve the precision of first packet application classification. In some implementations, the system receives application signatures from devices along with their network identifiers. Based upon the frequency at which identical application signatures appear as originating from distinct network environments, the system determines the validity of application signatures and avoids storing irrelevant information for routing network traffic.

In one aspect, the present disclosure is directed to a method for application-based packet classification. The method includes receiving, by a server from a plurality of devices, a plurality of application signatures, each application signature identifying an application and an associated destination address of communications associated with the application, each device associated with a network identifier identifying a network environment of each device. The method also includes determining, by the server, that an application signature is valid based on a comparison of application signatures from a plurality of devices associated with different network identifiers. The method also includes providing, by the server to the plurality of devices, the valid application signature, responsive to the determination, the plurality of devices routing network traffic using the valid application signature.

In some implementations, the plurality of devices apply a processing policy associated with the application to packet flows to the destination address associated with the application, responsive to receipt of the valid application signature. In some implementations, the plurality of devices additionally apply the processing policy associated with the application to the packet flows to the destination address associated with the application based on information of packets of the pack flows at a layer of a network stack at or lower than a transport layer. In some implementations, each application signature is generated by a device from application layer information of a first packet of a corresponding packet flow.

In some implementations, the method includes incrementing a value associated with a first application signature received from a first device associated with a first network identifier and stored in a signature candidate database, responsive to receipt of the first application signature from a second device associated with a different, second network identifier. In determining that the application signature valid, the method includes determining that the application signature is valid responsive to a value associated with the application signature in a signature candidate database exceeding a threshold. In some implementations, the method also includes adding a first application signature to the signature candidate database upon receipt of the first application signature from a first device of the plurality of devices.

In some implementations, the method includes decrementing a value associated with a first application signature received from a first device associated with a first network identifier and stored in a signature candidate database, responsive to expiration of a predetermined time period without receipt of the first application signature from a second device associated with a different, second network identifier. The method also includes removing the first signature from the signature candidate database, responsive to the value associated with the first application signature being below a predetermined threshold. In some implementations, each application signature comprises an identification of an application that generated a request to the associated destination address and an address tuple comprising the associated destination address and a port number.

In another aspect the present disclosure is directed to a system for application-based packet classification. The system includes a server comprising a network interface in communication with a plurality of devices and a processor, the processor configured to receive, from the plurality of devices, a plurality of application signatures, each application signature identifying an application and an associated destination address of communications associated with the application, each device associated with a network identifier identifying a network environment of each device; determine that an application signature is valid based on a comparison of application signatures from a plurality of devices associated with different network identifiers; and provide, to the plurality of devices, the valid application signature, responsive to the determination, the plurality of devices routing network traffic using the valid application signature.

In some implementations, the plurality of devices are configured to apply a processing policy associated with the application to packet flows to the destination address associated with the application, responsive to receipt of the valid application signature. In some implementations, the plurality of devices are configured to apply the processing policy associated with the application to the packet flows to the destination address associated with the application based on information of packets of the packet flows at a layer of a network stack at or lower than a transport layer. In some implementations, each application signature is generated by a device from application layer information of a first packet of a corresponding packet flow.

In some implementations, the processor is configured to increment a value associated with the first application signature received from a first device associated with a first network identifier and stored in a signature candidate database, responsive to receipt of the first application signature from a second device associated with a different, second network identifier. The processor is configured to determine that the application signature is valid responsive to a value associated with the application signature in a signature candidate database exceeding a threshold.

The details of various embodiments are set forth in the accompanying drawings and the description below.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
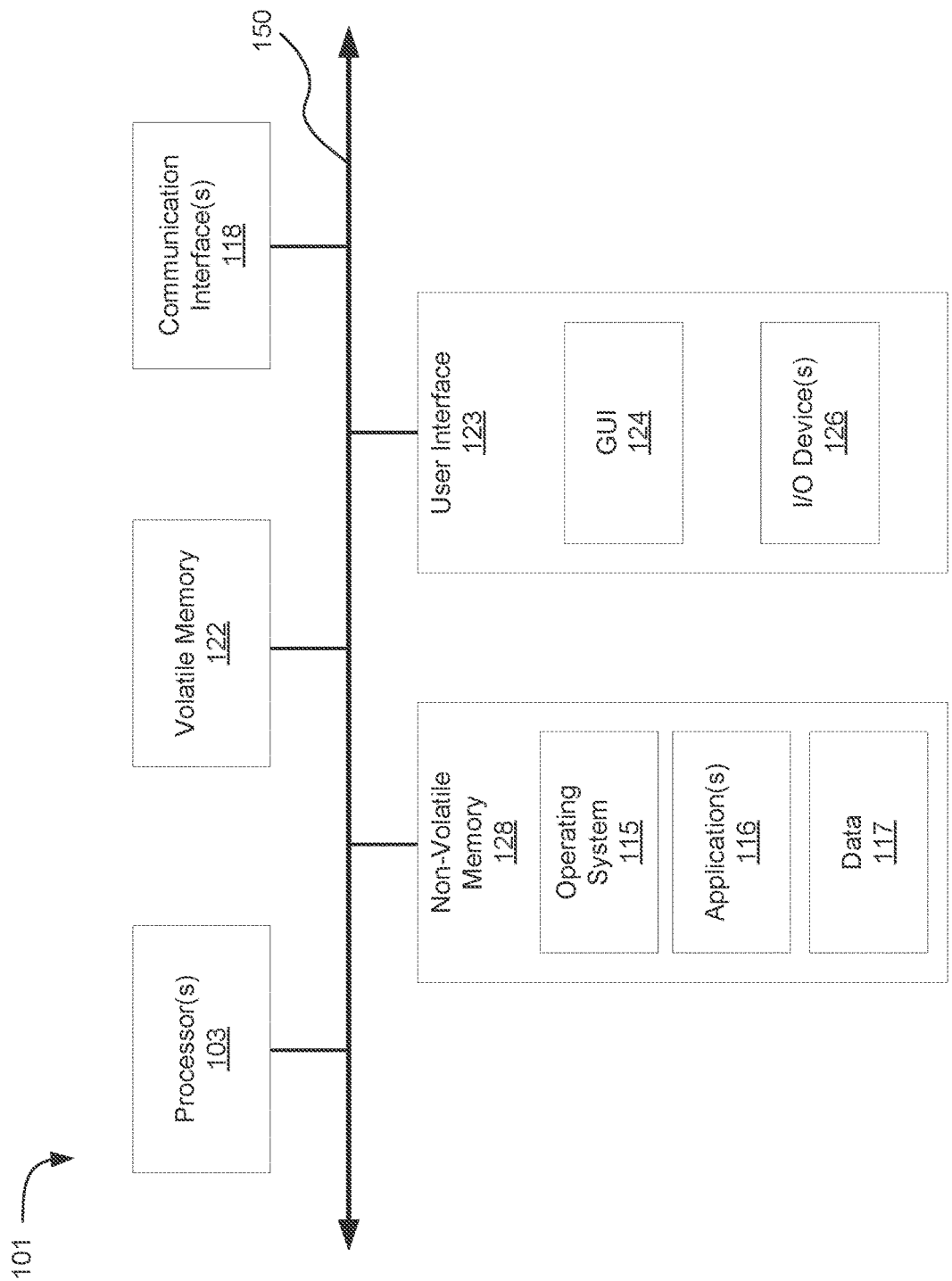
FIG. 1 is a block diagram illustrating an implementation of a network environment for use with the systems and methods discussed herein.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods for filtering out noisy application signatures to improve precision of first packet application classification

A. Computing Environment

Prior to discussing the specifics of embodiments of the systems and methods for filtering out noisy application signatures to improve precision of first application classification, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O devices(s) 126. Various elements of computer 101 may communicate via one or more communication buses, shown in communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" a be embodied in one or more application specific integrated circuits (ASICs), microprocessors, digital signal processors (DSPs) graphics processing units (GPUs), microcontrollers, field programmable gate arrays (FPGAs), programmable logic arrays (PLAs), multi-core processors, or general-purpose computers with associated memory. The "processor" may be analog, digital, or mixed-signal. In some embodiments, the "processor" may be one or more physical processors or one or more "virtual" (e.g., remotely located or "cloud") processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods to Filter Out Noisy Application Signatures to Improve Precision of First Packet Application Classification Classifying a connection to a destination internet protocol (IP) address according to a corresponding application is useful for performing application-based routing and other networking functions. These networking functions may include application routing, optimizing bandwidth usage, improving application performance, and using application firewalls. Application-based routing of network traffic is possible through the capability to do first packet classification for a network connection. One method to achieve first packet classification of network connections is by implementing deep packet inspection (DPI): the first time a connection is observed or received (e.g. a first packet of a connection, a request to establish a connection, etc.), a device may classify the connection by inspecting the data patterns of the initial packet or few packets, SSL certificates, and other identifying information, including at higher layers of the network stack (e.g. session layer, application layer, etc.). This may involve decrypting and/or decompressing portions of the packet, in some implementations.

Deep packet inspection is highly costly in terms of time and processor resources. To avoid performing DPI on the first packets of every new connection, in many implementations, new connections may be "matched" to or correlated with prior connections that have been inspected and classified, for example based on destination IP addresses and/or ports, payload size, header information at lower layers of the network stack (e.g. transport layer, network layer, etc.). A lookup table can be created that stores the mapping or association between this information and the classified application, each mapping or association sometimes referred to as an "application signature" or by similar terms. Subsequent connections to the same IP address or having the same characteristics may be classified on the first packet using the lookup table, without requiring DPI, reducing processing requirements.

A difficulty arises in cases of peer-to-peer applications such as voice over IP (VoIP) communications. A large number of connections may be generated, some between a client IP address and an application server and some directly between different peer client IP addresses. For example, a first client may contact a VoIP provider via a first connection and request to establish communications with a second client. The VoIP provider may notify the second client of the new call, and the first and second client may establish a direct peer-to-peer connection for the communication. This reduces bandwidth and processing requirements on the VoIP provider, as it is not an intermediary to every communication using its network.

However, including these peer-to-peer connections in an application signature lookup table may be undesirable: the resulting lookup table may be large and inefficient, over-populated with rarely-used or only once-used connection details, increasing memory requirements and slowing down queries of the table for important or often-used connection details. For example, an enterprise with thousands of client users may frequently utilize peer-to-peer connections for communicating between or amongst the client users, such as for VoIP communications, file or screen sharing, video chatting, etc., potentially resulting in many, many thousands of entries in the lookup table (e.g., 1000 clients connecting amongst themselves may result in 499,500 peer-to-peer connections, if every client connects at least once to every other client; the resulting lookup table may even be significantly larger, if connections are further classified by application or other information). These peer-to-peer addresses or other rarely used connections may be referred to as "noisy" connections or noisy addresses, due to the large amount of data generated managing such connections. Entries may also be referred to as connection signatures, flow signatures, application signatures, or by similar terms. The storage of peer IP addresses in a lookup table may also misidentify the peer IP addresses as originating from an application server, thereby leading to the incorrect routing of network traffic. For example, in some instances, an intermediary device such as a router or gateway may identify a new connection between a first client and second client as associated with VoIP communications; when a third client transmits a request to initiate a VoIP communication with another entity, the intermediary device may attempt to route the request to the first or second client, believing them to be an application server for establishing such sessions, rather than just a peer-to-peer endpoint.

Figure 2:
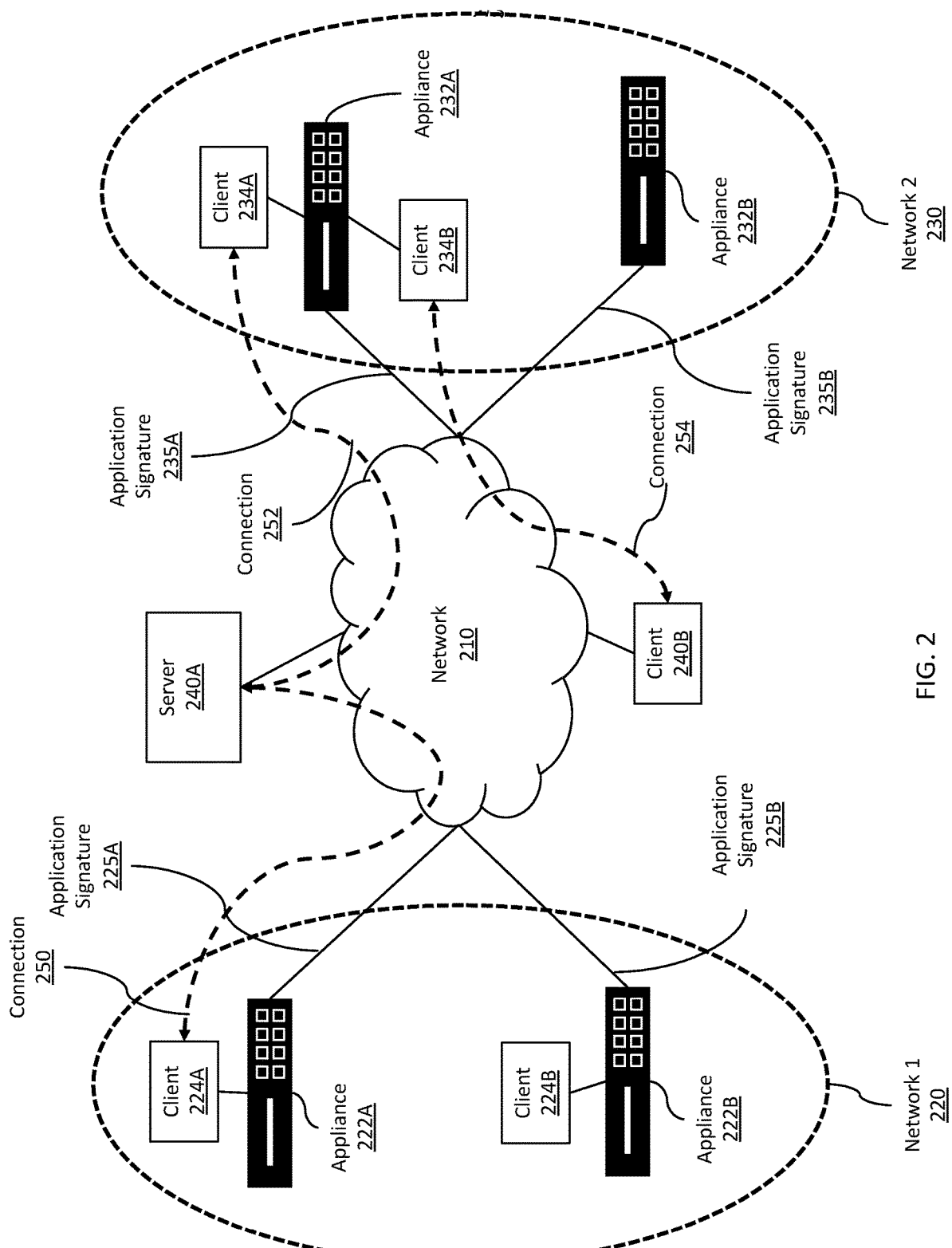
FIG. 2 is a block diagram illustrating an implementation of a system for filtering out noisy application signatures.

FIG. 2 is a block diagram illustrating an implementation of a system for filtering out noisy addresses. In this example, appliance 222A and appliance 222B belong to network 1 220 and have identical network identifiers corresponding to network 1 220. Appliance 232A and appliance 232B belong to network 2 and have identical network identifiers corresponding to network 2 230. Appliance 222A, appliance 222B, appliance 232A and appliance 232B have the ability to communicate with server 240A through network 210. It will be appreciated that a plurality of appliances can belong to a given network and a plurality of networks can exist.

In some implementations, clients connected with appliances and carry out actions, such as requests for and receipts of information. For example, client 224A carries out actions while connected to appliance 222A, client 224B carries out actions while connected to appliance 222B, client 234A and client 234B both carry out actions while connected to appliance 232A, and client 240B carries out actions while on network 210. Client 224A communicates with server 240A through connection 250. Client 234A communicates with server 240A through connection 252 (connections 250, 252 may be transport layer connections or higher layer connections, and may each comprise several physical layer connections). Client 234B communicates with client 240A through connection 254. As shown, there are various connections that can exists and numerous iterations of connections between devices and entities that are not shown. These examples are provided to show that clients may be connected to servers (connection 250 and connection 252), clients may be connected to clients (connection 254), clients may interface with appliances (client 224A, client 234A, and client 234B with appliance 222A, 232A, and 232A, respectively), or clients may be communicate directly with a server through a network (e.g., network 210).

Appliances capable of performing deep packet inspections can generate application signatures in order to identify connections or flows, and may export application signatures to a server 240A for distribution to other devices. For example, appliance 222A exports application signature 225A through network 210 to server 240A. In addition, appliance 222B exports application signature 225B through network 210 to server 240A. Because appliance 222A and 222B are both in network 1, they have the same network identifier corresponding to network 1. Appliance 232A exports application signature 235A through network 210 to server 240A. In addition, appliance 232B exports application signature 235B through network 210 to server 240A. Because appliances 232A and 232B are both in network 2, they have the same network identifier corresponding to network 2. Although the system may generally be described in connection with appliances, the appliances may be any type and form of device, such as a network device or server, and/or a computing device intermediary to one or more clients and one or more servers.

Application signatures (225A-225B, 235A-235B) may be used to identify connections, and may be based on various information about the connections, such as source and destination IP addresses and/or ports, higher layer protocols such as session or application layer protocols, explicit application identifiers, etc. Application signatures may be generated from deep packet inspection of packets traversing the appliance or other device. While deep packet inspection is frequently costly in terms of processing time and latency, the application signatures may be used to quickly identify similar connections, without requiring deep packet inspection. For example, an intermediary device may examine requests from a client to establish a connection to an application server for accessing a web application, and may generate application signatures in order to classify the connections. When receiving a subsequent request from a client device to the same application server, the intermediary device may match the subsequent request to the application signature, and determine that the subsequent request is likely associated with the same application (and should receive the same quality of server (QoS) settings, routing selection settings, compression or encryption parameters, etc.).

In some implementations, application signatures are considered identical if they originate from or correspond to the same application (e.g. a web application, a file server application, a database server application, etc.). In order to reduce the number of application signatures generated from "noisy" connections as discussed above, application signatures may be given a score representing the number of distinct connections matching the application signature. If the score is lower than a predetermined threshold, the signature may be considered a "candidate" signature, but may not necessarily be added to a signature lookup table or distributed to other devices. If the score is above the threshold, the signature may be "promoted" from candidate status and may be identified as a valid signature (and provided to other devices for use in a lookup table, etc.). The threshold may be static or dynamic (e.g. may be based on a percentage value of a total number of connections, rather than a set number), and may be set by an administrator or manufacturer of a device, or may be dynamically determined based on performance (e.g. accuracy of routing and application selection, etc.).

In some implementations, a signature's score may be incremented only if matching connections are identified from distinct network environments—for example, it may not be desirable to increment a score for an application signature that corresponds to a peer-to-peer connection between two clients that is used frequently (e.g. two users that frequently call each other throughout the day), as this would lead to inclusion of the signature in lookup tables for other appliances that may never see a corresponding connection (or may inaccurately route other VoIP connections as a result). Instead, in such implementations, the scores may only be incremented when matching connections are identified from different network environments (e.g. network 1 220 and network 2 230 in FIG. 2). Thus, for example, a first candidate signature may be generated for connection 250 from client 224A to server 240A from deep packet inspection of the initial packet of the connection. A second signature may be generated for connection 252 from client 234A to server 240A from deep packet inspection of the initial packet of this connection, and the second signature matched to the first signature; upon determining they match or correspond to the same application, a score for the first candidate signature may be incremented (and the second signature discarded). However, if client 224B established a similar connection to server 240A with a signature that matched the candidate signature, its score would not be incremented, as both client 224A and client 224B are in the same network environment 220. Although in the example of FIG. 2, server 240A is an external server that is used by both network environments, in other instances, the server may be internal to a network environment (e.g. a local data server or backup server, or other such device). While devices within a single network environment may connect to such servers frequently, they may not be accessed by devices outside of the network environment. By not incrementing scores for signatures for such servers, the signatures are not promoted and provided to other devices or appliances in other network environments, avoiding needlessly filling their lookup tables. Such implementations do not require the appliances to explicitly identify whether servers are located within the network environment or not or are otherwise inaccessible to external devices, but rather may infer this based on whether the appliances receive connections or signatures from clients in other network environments.

In some implementations, the scores may be automatically reduced over time (e.g. incremented when a corresponding connection is identified, but decremented if a predetermined time period passes with no corresponding connection). If a candidate signature's score reaches zero, it may be removed from the set of candidate signatures. Thus, by creating this two-stage filtering process of generating candidate signatures and either promoting them to distributed lookup tables or removing them as candidates responsive to not receiving distinct connections corresponding to the candidate signatures, the systems and methods disclosed herein provide for smaller lookup tables with noisy or irrelevant signatures corresponding to peer-to-peer connections or other rarely used connections removed. In addition to reducing memory requirements for the tables and network bandwidth to distribute the tables (potentially allowing the tables to be more frequently updated, in some implementations), the smaller tables may be searched faster, consuming fewer processor resources and decreasing processing delays when matching packets of newly received connections to signatures, without requiring deep packet inspection.

Figure 3:
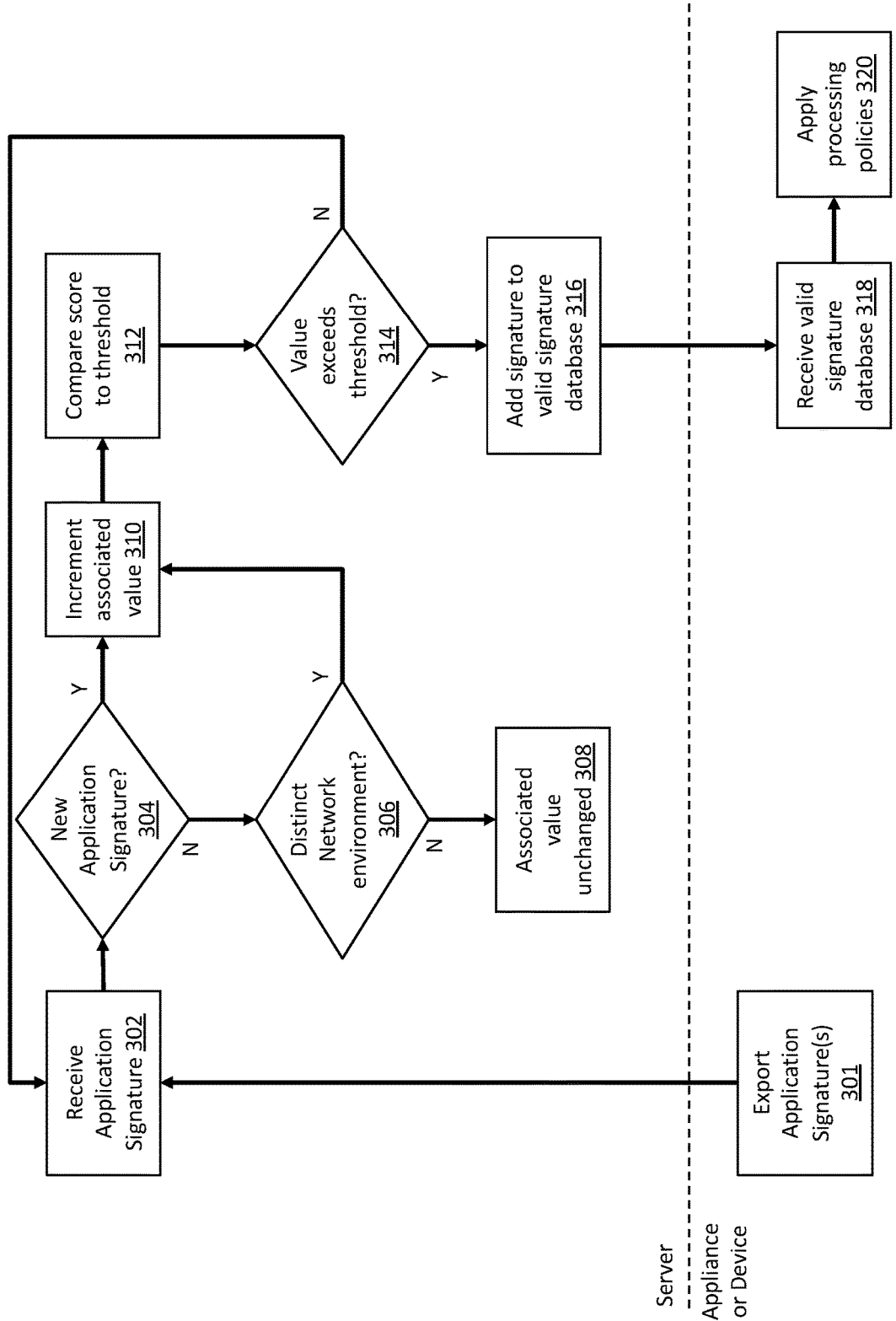
FIG. 3 is a flow chart illustrating an implementation of a method for filtering out noisy application signatures.

FIG. 3 is a flow chart illustrating an implementation of a method for filtering out noisy application signatures. At step 301, a device may generate and provide an application signature to a central server or signature candidate server. In some implementations, an application signature identifies an application and characteristics of communications associated with the application, such as destination addresses or port numbers, payload lengths, QoS parameters, etc. For example, a signature may indicate that connections to IP address and port 1.2.3.4/500 are associated with a web productivity application, and may require lossless connections but can tolerate some latency. In some implementations, an application signature is generated by a device from application layer information or other such information of a first packet of a corresponding packet flow via deep packet inspection. In other implementations, an application signature may be associated with an application that generated a request for access or established a connection to a server at a tuple of a destination address and a port number, such as a request for a media file generated by a media player application. In some implementations, a device capable of performing deep packet inspections exports application signatures to a centralized server or repository for addition to a candidate signature list.

At step 302, in some implementations, a server receives an application signature. In some implementations, the server receives a plurality of application signatures from a plurality of devices. In some implementations, the server is a passive receiver of packet information from a device or multiple devices. In other implementations the server may collect or retrieve application signatures from a device or multiple devices. For example, the server may periodically request locally generated application signatures from different appliances or devices on a network, and may also provide updated sets of valid application signatures. Such periodic requests or retrievals may be performed hourly, daily, weekly, or on any other time frame. The appliances or devices may provide application signatures in response to such requests. Application signatures may be provided in any format, such as parameter-value pairs in a RESTful request; XML data; or in any other data structure.

At step 304, in some implementations, the server determines if the application signature is a new application signature. In some implementations, a new application signature is one that does not have an entry in a database of stored application signatures. For example, if there is a new application signature, then the entry for that application signature in the database of stored application signatures would be added to the set of candidate signatures. As discussed above, candidate signatures may comprise application signatures that have not yet been identified as valid, e.g. by having an associated score greater than a threshold. When an application signature is received, the server may compare the received signature to signatures identified as valid in the lookup table as well as signatures in the candidate signature set. If the signature is not present in either list, then the new signature may be added to the candidate signatures list. In some implementations, new signatures may instead be explicitly identified as new signatures by the appliance or device. For example, a device or appliance may include an identifier (e.g. preset flag, predetermined bit value, etc.) with an application signature to indicate that the new application signature did not match an application signature in a lookup table of valid application signatures stored at the device or appliance. In some implementations, devices or appliances may only provide new application signatures to the server; accordingly, the server need not check for the signature in the lookup table of valid signatures, but may only check whether the application signature is included in the list of candidate application signatures.

At step 306, if the application signature is not a new application signature (e.g. if it exists in the candidate signature list), then the server may determine if the application signature originates from a distinct network environment. In some implementations, a device or appliance may include a network identifier set by an administrator or user of the system to indicate its associated network environment, such as a numeric code. Application signatures in the candidate list may be associated with the network identifier of the device or appliance that provided the new application signature, and, in some implementations, with additional network identifiers for each additional device or appliance that also provided a corresponding application signature. In some implementations, the server may continue to receive application signatures from various devices while it makes a determination as to whether the application signature in question originated from a distinct network environment. In other implementations, a distinct network environment is one that does not have the same network identifier.

At step 308, in some implementations, upon determining that the application signatures do not originate from distinct network environments, the server does not change the value or score associated with the application signature. The implication of a scenario where the value associated with application signature remains unchanged is that a client device established a connection with another client device or server in the same network environment, and thus may be a peer-to-peer connection. By not incrementing the score or value associated with the application signature in the candidate database for connections not from distinct network environments, then signatures associated with peer-to-peer connections will not be added or promoted into the database of valid application signatures.

At step 310, in some implementations, upon determining that the application signature originates from a distinct network environment, the server may increment the value or score associated with the application signature. In some implementations, the value can exist as a counter that tracks the number of times the value has been incremented. As discussed above, the counter value may be compared to a threshold to determine whether the signature should be promoted to the valid application signature list.

At step 312, in some implementations, the server may compare the score associated with an application signature in the candidate database of application signatures to a threshold. The threshold may be set by an administrator or user of the system, and/or may be dynamically determined (e.g. as a percentage relative to a highest scoring candidate or number of requests received within a predetermined time period, or any other such means). In some implementations, the server may determine a total score from a plurality of scores associated with the application signature. For example, in some implementations, a different value may be maintained for each network identifier associated with the application signature (e.g. environment A-score A; environment B-score B; etc.). In some implementations, the server may compare a total of the associated scores to the threshold. In other implementations, each environment-associated score may be compared to the threshold separately. In some implementations, the candidate database may comprise a mapping between application signatures and the devices associated with different network identifiers. In some implementations, step 312 may be performed upon receipt of each newly received signature; in other implementations, step 312 may be performed periodically (e.g. once per hour, once per day, etc.).

At step 314, in some implementations, if the value associated with an application signature in the candidate database does not exceed the threshold, the server may return to step 302 and repeat the process for subsequently received application signatures. In other implementations, steps 312-314 may be repeated for each additional signature in the candidate database. If the value associated with an application signature exceeds the threshold, then at step 316, the application signature may be added or promoted to the valid application signature list or database (e.g. removing the application signature from the candidate application signature list).

The server may provide the valid application signature database or list to appliances or other intermediary devices in each network environment. In some implementations, the entire database or list may be periodically provided, while in other implementations, just additions to the list or database may be provided (to reduce network bandwidth requirements). The list or updates may be provided periodically, or responsive to each received application signature that results in a candidate signature being promoted from the candidate signature list.

At step 318, in some implementations, the devices may receive the valid application signature database or updates to the database, and replace or update local copies of the database. Appliances or devices routing network traffic may receive the updates or list of valid application signatures, and at step 320, may use the application signatures to apply application or session layer based processing policies to matching traffic (e.g. applying QoS configurations or settings or other prioritization or load balancing schemes, routing traffic amongst paths according to application-associated policies, etc.), without requiring deep packet inspection of the traffic to match the traffic to an application, or using only information from lower layers of the network stack (e.g. at or below a transport layer of the network stack). For example, upon receipt of a first packet of a new connection or flow, the device may determine that lower layer parameters of the first packet (e.g. network or transport layer header information) and/or other characteristics (e.g. time of day, day of week, client device type, etc.) correspond to an application signature in the valid application signature database, and may classify the new connection or flow as associated with an application corresponding to the application signature. The device may then apply processing policies to the connection or flow (e.g. buffering, multiplexing, encryption, compression, routing, load balancing, prioritization, etc.) according to polices associated with the application (e.g. lower latency communications for video chat or voice communications, or streaming media; more reliable communications pathways for file transfers; etc.).

Accordingly, the systems and methods discussed herein provide for filtering out noisy application signatures to improve the precision of first packet application classification. In some implementations, the system receives application signatures from devices along with their network identifiers. Based upon the frequency at which identical application signatures appear as originating from distinct network environments, the system determines the validity of application signatures and avoids storing irrelevant information for routing network traffic.

In should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and that these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code languages such as JAVA. The software programs or executable instructions may be stored on or in one or more articles of manufacture as object code.

While the foregoing writing description of the methods and systems enable one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufactured using programmable and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMS, ROMs, PROMs, RAMs, SRAMs, etc.), hardware (e.g., integrated circuit chip, Field Programmable Gate Array (FPGA), Application Specified Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The articles of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described method and systems. Thus, the scope of the methods and systems described herein should not be limited by any of the illustrative embodiments and should be defined in accordance with the accompanying claims and their equivalents.

What is claimed is:

1. A method for application-based classification, comprising:

receiving, by a server from a plurality of devices, a plurality of application signatures, each application signature identifying an application and an associated destination address of communications associated with the application, each device associated with a network identifier identifying a network environment of each device;

determining, by the server, that a first application signature received from a first device associated with a first network identifier is identical to a second application signature received from a second device associated with a different, second network identifier;

incrementing, by the server, a value associated with the first application signature and stored in a signature candidate database, responsive to the determination that the first application signature is identical to the second application signature;

determining, by the server, that the first application signature is valid responsive to the value associated with the first application signature exceeding a threshold; and providing, by the server to the plurality of devices responsive to the determination, the valid application signature, the plurality of devices routing network traffic using the valid application signature.

2. The method of claim 1, wherein the plurality of devices apply a processing policy associated with the application to packet flows to the destination address associated with the application, responsive to receipt of the valid application signature.

3. The method of claim 2, wherein the plurality of devices apply the processing policy associated with the application to the packet flows to the destination address associated with the application based on information of packets of the packet flows at a layer of a network stack at or lower than a transport layer.

4. The method of claim 3, wherein each application signature is generated by a device from application layer information of a first packet of a corresponding packet flow.

5. The method of claim 1, further comprising adding the first application signature to the signature candidate database, upon receipt of the first application signature from a first device of the plurality of devices.

6. The method of claim 1, further comprising:
decrementing a value associated with a first application signature received from a first device associated with the first network identifier and stored in the signature candidate database, responsive to expiration of a time period without receipt of the first application signature from the second device associated with a different, second network identifier; and
removing the first application signature from the signature candidate database, responsive to the value associated with the first application signature being below the threshold.

7. The method of claim 1, wherein each application signature comprises an identification of an application that generated a request to the associated destination address and an address tuple comprising the associated destination address and a port number.

8. A system for application-based packet classification, comprising:
a server comprising a network interface in communication with a plurality of devices and a processor, the processor configured to:
receive, from the plurality of devices, a plurality of application signatures, each application signature identifying an application and an associated destination address of communications associated with the application, each device associated with a network identifier identifying a network environment of each device,
determine that a first application signature received from a first device associated with a first network identifier is identical to a second application signature received from a second device associated with a different, second network identifier;
increment a value associated with the first application signature and stored in a signature candidate database, responsive to the determination that the first application signature is identical to the second application signature;
determine that the first application signature is valid responsive to the value associated with the first application signature exceeding a threshold, and
provide, to the plurality of devices responsive to the determination, the valid application signature, the plurality of devices routing network traffic using the valid application signature.

9. The system of claim 8, wherein the plurality of devices are configured to apply a processing policy associated with the application to packet flows to the destination address associated with the application, responsive to receipt of the valid application signature.

10. The system of claim 9, wherein the plurality of devices are configured to apply the processing policy associated with the application to the packet flows to the destination address associated with the application based on information of packets of the packet flows at a layer of a network stack at or lower than a transport layer.

11. The system of claim 10, wherein each application signature is generated by a device from application layer information of a first packet of a corresponding packet flow.

12. The system of claim 8, wherein the processor is further configured to add the first application signature to the signature candidate database, upon receipt of the first application signature from a first device of the plurality of devices.

13. The system of claim 8, wherein the processor is further configured to:
decrement a value associated with a first application signature received from a first device associated with the first network identifier and stored in the signature candidate database, responsive to expiration of a predetermined time period without receipt of the first application signature from the second device associated with a different, second network identifier; and
remove the first application signature from the signature candidate database, responsive to the value associated with the first application signature being below the threshold.

14. The system of claim 8, wherein each application signature comprises an identification of an application that generated a request to the associated destination address and an address tuple comprising the associated destination address and a port number.

15. A non-transitory computer-readable medium comprising instructions that, when executed by a processor, cause the processor to:
receive, from a plurality of devices, a plurality of application signatures, each application signature identifying an application and an associated destination address of communications associated with the application, each device associated with a network identifier identifying a network environment including the device,
determine that a first application signature received from a first device associated with a first network identifier is identical to a second application signature received from a second device associated with a different, second network identifier;
increment a value associated with the first application signature and stored in a signature candidate database, responsive to the determination that the first application signature is identical to the second application signature;

determine that the first application signature is valid responsive to the value associated with the first application signature exceeding a threshold, and provide, to the plurality of devices, the valid application signature, responsive to the determination, the plurality of devices routing network traffic using the valid application signature.

16. The computer-readable medium of claim 15, wherein the plurality of devices are configured to apply a processing policy associated with the application to packet flows to the destination address associated with the application, responsive to receipt of the valid application signature.

17. The computer-readable medium of claim 15, further comprising instructions that cause the processor to:

decrement a value associated with a first application signature received from a first device associated with the first network identifier and stored in the signature candidate database, responsive to expiration of a predetermined time period without receipt of the first application signature from the second device associated with a different, second network identifier; and remove the first application signature from the signature candidate database, responsive to the value associated with the first application signature being below the threshold.

* * * * *